(12) United States Patent
Shirase (10) Patent No.: US 6,669,248 B2
(45) Date of Patent: Dec. 30, 2003

(54) LATCH AND DRAWER DEVICE USING LATCH

(75) Inventor: Yuichi Shirase, Aichi-ken (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 10/246,448

(22) Filed: Sep. 19, 2002

(65) Prior Publication Data

US 2003/0062730 A1 Apr. 3, 2003

(30) Foreign Application Priority Data

Oct. 2, 2001 (JP) ........................................ 2001-306373

(51) Int. Cl.⁷ ............................................... E05C 19/00
(52) U.S. Cl. ............................... 292/300; 292/DIG. 4; 292/DIG. 51; 292/DIG. 55
(58) Field of Search ..................... 292/340, DIG. 4, 292/341.15, 341.17, 341.18, 341.12, 341.13, DIG. 51, DIG. 55; 248/311.2, 310, 313, 292.12, 289.11; 297/188.15, 188.17; 224/926, 281; 403/321, 322.3, 325, 322.4; 296/37.9; 312/333

(56) References Cited

U.S. PATENT DOCUMENTS

| | | | | |
|---|---|---|---|---|
| 2,817,554 A | * | 12/1957 | Hasselmark | 292/340 |
| 4,641,747 A | * | 2/1987 | Mestdagh et al. | 206/308.1 |
| 4,738,423 A | * | 4/1988 | DiFilippo et al. | 248/311.2 |
| 4,779,906 A | * | 10/1988 | Kurosaki | 292/19 |
| 4,792,165 A | * | 12/1988 | Nishimura | 292/19 |
| 4,917,416 A | * | 4/1990 | Westphal et al. | 292/175 |
| 5,050,922 A | * | 9/1991 | Falcoff | 296/37.7 |
| 5,072,974 A | * | 12/1991 | Henne | 292/126 |
| 5,267,761 A | * | 12/1993 | Curtindale et al. | 292/81 |
| 5,427,447 A | * | 6/1995 | Satoh | 312/309 |
| 5,498,039 A | * | 3/1996 | Bivens | 292/145 |
| 5,511,839 A | * | 4/1996 | Fuss et al. | 292/341.18 |
| 5,620,228 A | * | 4/1997 | Ito et al. | 297/188.17 |
| 5,692,718 A | * | 12/1997 | Bieck | 248/311.2 |
| 5,775,748 A | * | 7/1998 | Kurachi | 292/341.15 |
| 5,818,691 A | * | 10/1998 | McMahan et al. | 361/686 |
| 5,878,986 A | * | 3/1999 | Sun et al. | 248/311.2 |
| 6,056,333 A | * | 5/2000 | Wach | 292/145 |
| 6,247,733 B1 | * | 6/2001 | Weiland | 292/228 |
| 6,450,468 B1 | * | 9/2002 | Hamamoto | 248/311.2 |
| 6,464,187 B1 | * | 10/2002 | Bieck et al. | 248/311.2 |

FOREIGN PATENT DOCUMENTS

| | | |
|---|---|---|
| DE | 299 01 151 | 6/1999 |
| EP | 0 593 170 | 4/1994 |
| JP | 8-244514 | 9/2002 |
| WO | 01/14670 | 3/2001 |

* cited by examiner

*Primary Examiner*—Robert J. Sandy
*Assistant Examiner*—Dinesh N Melwani
(74) *Attorney, Agent, or Firm*—Kanesaka & Takeuchi

(57) ABSTRACT

A latch includes an attaching part rotationally attached to an attached part, a base plate connected to the attaching part to rotate together with the attaching part on the attached part, and a push-push type cam part connected to the base plate on a side opposite to the attaching part. Elastic pieces are formed to cooperate with the base plate for locating the base plate to a predetermined position while allowing the base plate to rotate together with the attaching part.

10 Claims, 6 Drawing Sheets

LATCH AND DRAWER DEVICE USING LATCH

BACKGROUND OF THE INVENTION AND RELATED ART STATEMENT

The invention relates to a push-push type latch that rotates (swings) with respect to an attached part, and also relates to a drawer device using the latch.

A conventional latch uses a metal spring or a resin spring in order to allow the latch to swing.

The conventional latch using the metal spring tends to make a clattering operating sound. Accordingly, there is a problem that a mechanical device using this latch has impaired sense of quality due to the clattering operating sound. Moreover, the latch using the resin spring has a problem such as deformation due to creep phenomenon over long-term use, thereby causing a strange sound during an operation or an erroneous operation.

This invention has been created in order to eliminate the circumstances as noted above. The invention provides a latch, as well as a drawer device using the same, in which a strange sound is not made during the operation and no deformation due to the creep phenomenon is caused even after a long-term use.

Further objects and advantages of the invention will be apparent from the following description of the invention

SUMMARY OF THE INVENTION

According to the present invention, a latch includes an attaching part for attaching to an attached part to be capable of rotation; a base plate part connected to the attaching part and rotating around the attaching part on a surface of the attached part; a push-push type cam part connected to the surface of the base plate part on a side opposite to the attaching part; and elastic pieces connected to both sides of the base plate part so as to abut against the attached part and urge the base plate part toward an original position.

Further, the invention also provides a drawer device in which a container part is disposed to be capable of sliding with respect to a housing so as to freely appear and disappear. The above-mentioned latch is attached to one of the housing and the container part, and a coupling part that operates on the cam part of the latch is provided on the other of the housing and the container part.

DETAILED DESCRIPTION OF PREFERRED EMBODIMENTS

Hereunder, embodiments of the present invention will be explained with reference to the accompanied drawings.

Figure 1:
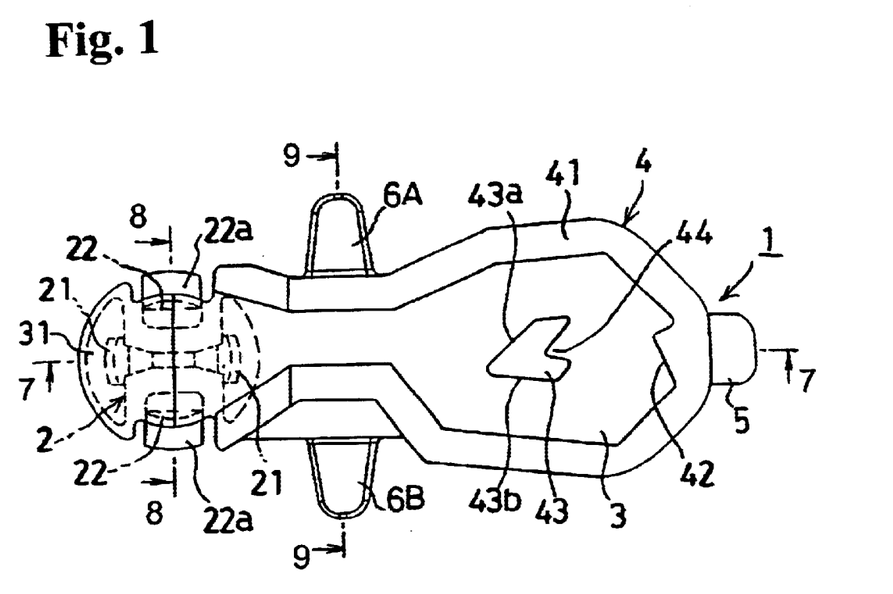
FIG. 1 is a plan view showing a latch in an embodiment of the invention.
Figure 2:
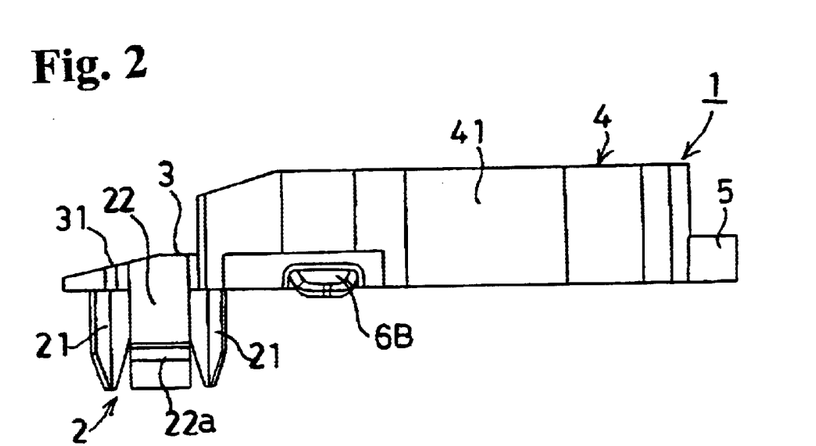
FIG. 2 is a front view of the latch shown in FIG. 1.
Figure 3:
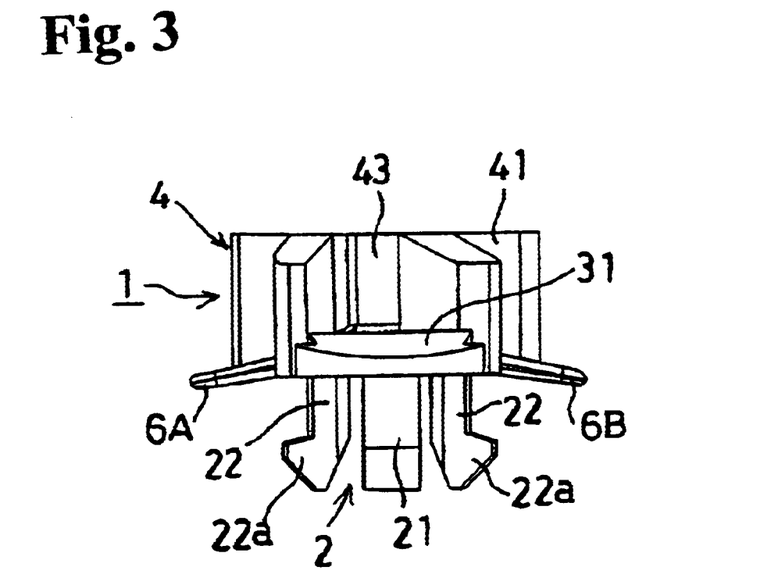
FIG. 3 is a left side view of the latch shown in FIG. 1.
Figure 4:
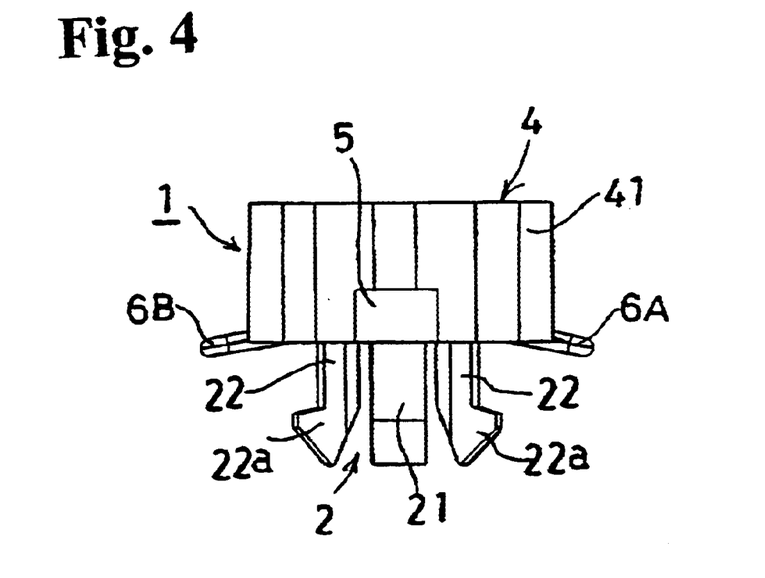
FIG. 4 is a right side view of the latch shown in FIG. 1.

FIG. 1 is a plan view showing a latch in an embodiment of the present invention, FIG. 2 is a front view of the latch shown in FIG. 1, FIG. 3 is a left side view of the latch shown in FIG. 1, and FIG. 4 is a right side view of the latch shown in FIG. 1.

In these drawings, reference numeral 1 indicates the latch made of a synthetic resin. The latch is formed of an attaching part 2 for attaching to a housing 82, as an attached part, described later, to be capable of rotation; a flat plate-shaped base plate part 3 connected to the attaching part 2 and rotating (swinging) around the attaching part 2 on a horizontal surface of the housing 82; a push-push type cam part 4 connected to a surface of the base plate part 3 on a side opposite to the attaching part 2; a coupling piece 5, as a coupling part, projecting and connected to an end of the base plate part 3 on a side opposite to the attaching part 2 for restricting a rotational range of the base plate part 3 and preventing the base plate part 3 from floating up from the housing 82; and elastic pieces 6A, 6B, connected to both sides of the base plate part 3 so as to abut against inclined surfaces 85A, 85B of the housing 82 and urge the base plate part toward an original predetermined position. Each elastic piece 6A or 6B is inclined to descend as the distance from the base plate part 3 increases.

The above-mentioned attaching part 2 is divided into four parts with intervals in the circumferential direction, and constituted by guide pieces 21 facing each other in the horizontal direction in FIG. 1, and coupling pieces 22 facing each other in the vertical direction in FIG. 1, each having a coupling claw 22a on an outer perimeter at a lower side. The guide pieces 21 and the coupling pieces 22 are disposed alternately in the circumferential direction.

Further, the base plate part 3 is provided with an inclined surface or a guide surface 31 on the left end in FIG. 1, as shown in FIG. 2 and FIG. 3.

Next, the cam part 4 is constituted by a guide wall 41, which forms a sack-shaped path with an opening at one end, and has an inclined surface part 42 pushed by a coupling pin 89, described later, at the deepest portion, and a heart-shaped island 43, which is disposed at the inside of the guide wall 41 and has an engaging part 44 engaging the coupling pin 89.

Reference numerals 43a, 43b indicate outer perimeter surfaces of the heart-shaped island 43, wherein the outer perimeter surface 43a is the half perimeter part on the upper side in FIG. 1, and the outer perimeter surface 43b is the half perimeter part on the lower side in FIG. 1.

Figure 5:
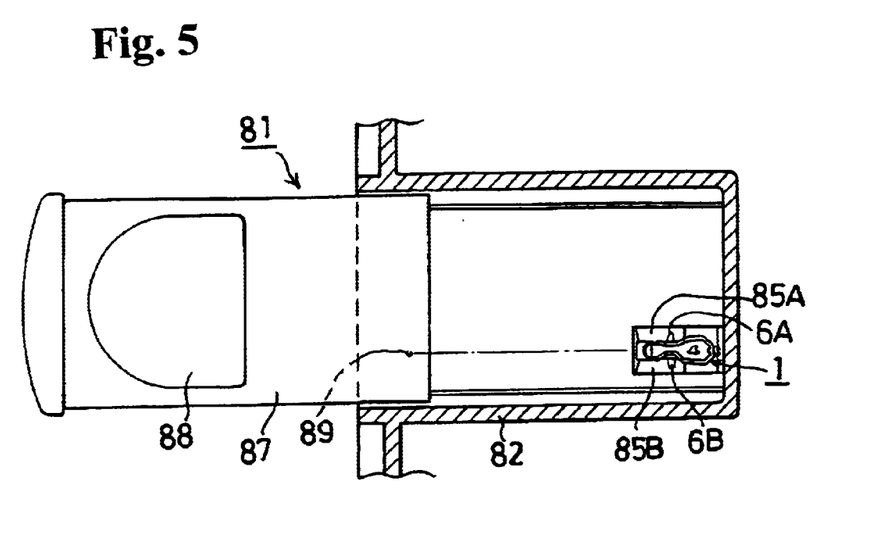
FIG. 5 is an explanatory drawing showing a configuration of a drawer device using a latch of an embodiment of the invention.
Figure 6:
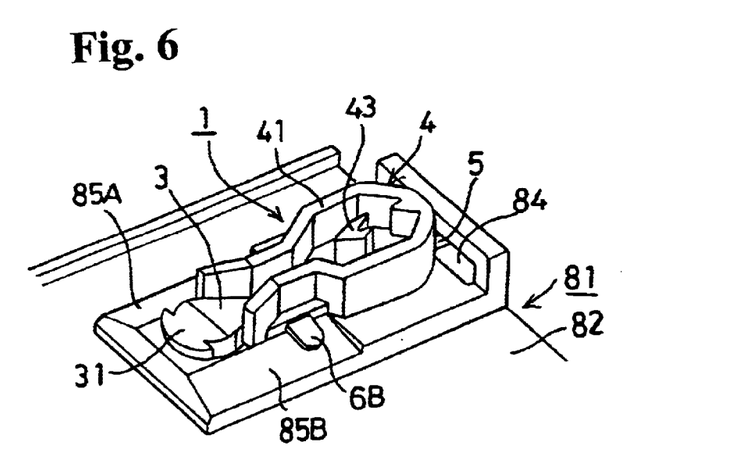
FIG. 6 is a perspective view of the latch part shown in FIG. 5.
Figure 7:
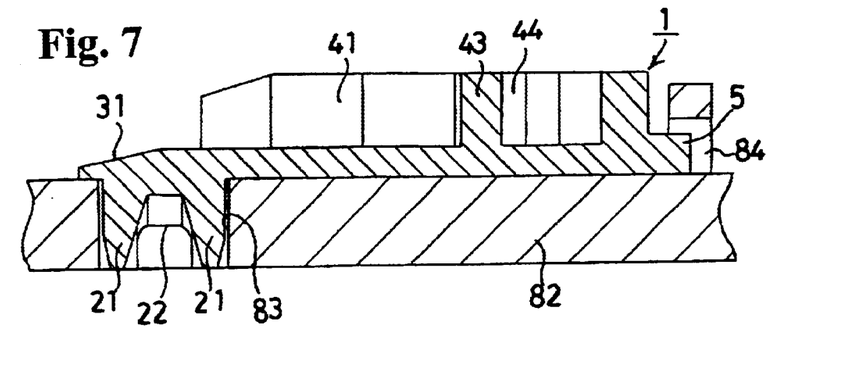
FIG. 7 is a sectional view of the latch part shown in FIG. 5 taken along line 7—7 in FIG. 1.
Figure 8:
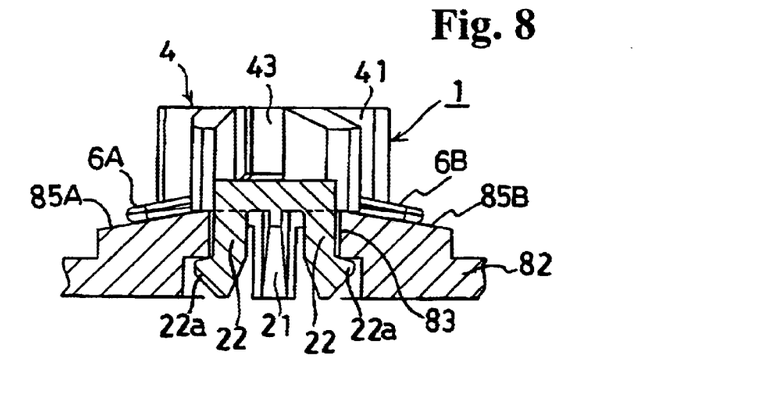
FIG. 8 is a sectional view of the latch part shown in FIG. 5 taken along line 8—8 in FIG. 1.
Figure 9:
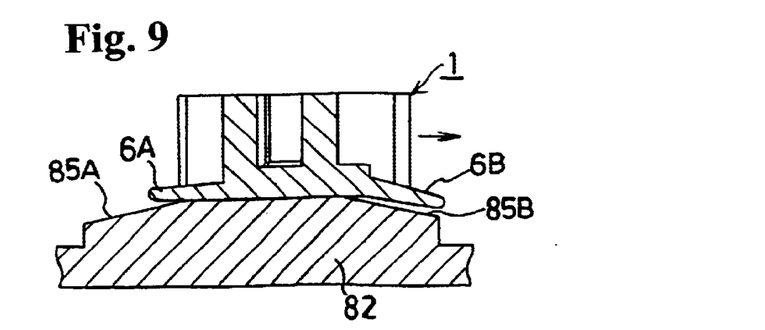
FIG. 9 is a drawing explaining an operation.
Figure 10:
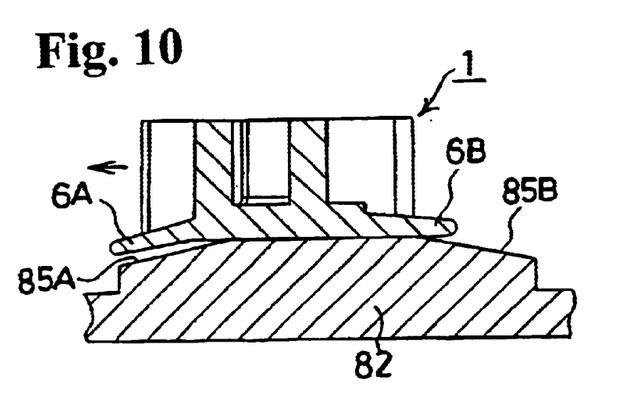
FIG. 10 is a drawing explaining an operation.

FIG. 5 is an explanatory drawing showing a configuration of a drawer device using the latch in the embodiment of the invention, and FIG. 6 is a perspective view of the latch part shown in FIG. 5. FIG. 7 is a sectional view of the latch part shown in FIG. 5 taken along line 7—7 in FIG. 1, and FIG. 8 is a sectional view of the latch part shown in FIG. 5 taken along line 8—8 in FIG. 1. FIG. 9 and FIG. 10 are drawings for explaining an operation. The same numerals are assigned to the components that are the same as in FIG. 1 to FIG. 4, and the explanations thereof are omitted. Incidentally, FIG. 9 and FIG. 10 are sectional views of the latch part shown in FIG. 5 taken along line 9—9 in FIG. 1.

In these drawings, reference numeral 81 indicates a drawer device provided in a vehicle, such as an automobile. The drawer device includes a housing 82, and a cup holder 87 as a container part, which is disposed to be capable of sliding with respect to the housing 82 so as to freely appear and disappear. Also, in the housing 82, a circular attachment hole 83 is provided in the horizontal surface part of the floor deep inside. An opening 84 that the coupling piece 5 engages is provided in the back wall part, and inclined surfaces 85A, 85B against which the elastic pieces 6A, 6B abut are provided respectively in the places corresponding to the elastic pieces 6A, 6B.

Also, the cup holder 87 is provided with a recess portion 88 for supporting a cup. In addition, a coupling pin 89 as a coupling part, which advances into the guide wall 41 to collide with the heart-shaped island 43 for causing the latch 1 to rotate (swing) and engaging the coupling part 44, is disposed on the bottom surface at a place corresponding to the latch 1.

Although it is not illustrated, between the housing 82 and the cup holder 87, an escape prevention mechanism is provided for preventing the cup holder 87 from escaping or disengaging from the housing 82. Also, although it is not illustrated, the cup holder 87 is urged toward a direction projecting from the housing 82 by a force of an urging member, for example a conston (constant torque) spring.

Furthermore, a part on the bottom side of the cup holder 87 corresponding to the latch 1 is cut out so that the latch 1 does not collide therewith.

Next, an attachment of the latch 1 to the housing 82 and an attachment of the cup holder 87 to the housing 87 will be explained.

First, after the coupling piece 5 is inserted into the opening 84, the attaching part 2 is pushed into the attachment hole 83, upon which the coupling claws 22a collide with the perimeter surface of the attachment hole 83, that is the housing 82, whereby bending the coupling pieces 22 inward. Therefore, the attaching part 2 can be inserted into the attachment hole 83.

Also, as shown in FIG. 8, when the coupling claws 22a pass through the attachment hole 83, the coupling pieces 22 return to the original state by their own elasticity, so that the coupling claws 22a engage the bottom surface of the housing 82. Thus, the latch 1 is attached to the housing 82 so as to rotate (swing) around the attaching part 2 within a range where the coupling piece 5 can rotate inside the opening 84.

Thus, when the latch 1 is attached to the housing 82 with the attaching part 2, because the elastic pieces 6A, 6B respectively abut against the inclined surfaces 85A, 85B as shown in FIG. 5, FIG. 6 and FIG. 8, the latch 1 comes to the expected original position (the position shown in FIG. 5, FIG. 6, and FIG. 8) by the elasticity or urging force of the elastic pieces 6A, 6B. Also, one end of the conston spring attached to the housing 82 is attached to a rear side of the cup holder 87, and the rear side of the cup holder 87 is inserted into the housing 82. Then, the cup holder 87 is attached to be capable of sliding with respect to the housing 82 so as to freely appear and disappear as shown in FIG. 5.

Next, an operation of the latch 1 is explained. First, in the state shown in FIG. 5, when the cup holder 87 is pushed into the housing 82 against the force of the conston spring, the coupling pin 89 passes over the inclined surface 31 and enters into the guide wall 41 to collide with the outer perimeter surface 43a of the heart-shaped island 43.

Also, when the cup holder 87 is further pushed into the housing 82 against the force of the conston spring, the coupling pin 89 pushes the outer perimeter surface 43a, so that the latch 1 rotates clockwise in FIG. 1 and FIG. 5 around the attaching piece 2 against the force of the elastic piece 6A, and becomes the state shown in FIG. 9.

When the latch 1 rotates in this manner, the coupling pin 89 advances up to the rear side of the heart-shaped island 43. Therefore, the latch 1 returns to the original position (the initial position), that is the position in FIG. 5, and the elastic pieces 6A, 6B abut against each inclined surface 85A, 85B by the force of the elastic piece 6A, as shown in FIG. 8.

When the pressing force on the cup holder 87 is released in this state, the cup holder 98 moves toward a direction projecting from the housing 82 by the force of the conston spring, so that the coupling pin 89 engages the checking part 44 of the heart-shaped island 43. Accordingly, the cup holder 87 is kept in the state being housed inside the housing 82.

Next, in order to make the cup holder 87 project from the housing 82, when the cup holder 87 is pushed into the housing 82 against the force of the conston spring, the coupling pin 89 collides with the inclined surface 42, so that the latch 1 rotates in the counterclockwise direction in FIG. 1 and FIG. 5 around the attaching part 2 against the force of the elastic piece 6B, and becomes the state in FIG. 10.

When the pressing force on the cup holder 87 is released in this state, the cup holder 87 moves toward the direction projecting from the housing 82 by the force of the conston spring.

When the cup holder 87 starts to move toward the direction projecting from the housing 82 in this manner, the latch 1 returns to the original position (the initial position), that is the position in FIG. 5, by the force of the elastic piece 6B, and the elastic pieces 6A, 6B abut against the respective inclined surface 85A, 85B as shown in FIG. 8. Therefore, the coupling pin 89 escapes from the guide wall 41 without colliding with the guide wall 41 and the outer perimeter surface 43b, or slightly colliding with the guide wall 41 and the outer perimeter surface 43b. Accordingly, the cup holder 87 projects from the housing 82 up to the state shown in FIG. 5 by the force of the conston spring.

According to the latch 1 in the embodiment of the invention as described above, because the base plate part 3 is forced toward the initial or expected position by the elastic pieces 6A, 6B connected on both sides of the base plate part 3, and the elastic pieces 6A, 6B abut against the inclined surfaces 85A, 85B, a strange sound is not made during the operation and an erroneous operation can be eliminated.

Also, because the elastic pieces 6A, 6B are deformed only during the locking or unlocking, deformation due to a creep phenomenon becomes less likely to occur in the elastic pieces 6A, 6B, and the life becomes longer and an erroneous operation becomes less likely to occur.

Furthermore, because the base plate part 3 is forced toward the initial or expected position by the elastic pieces 6A, 6B connected on both sides of the base plate part 3, the latch 1 can rotate even when attached on the horizontal surface to perform the expected operation.

Because the drawer device 81 is constituted by using the latch 1, the life of the drawer device 81 can be longer. Also, it can provide a sense of quality due to the fact that a strange sound is no longer made during the operation.

Also, because the position in which the latch 1 is attached is no longer limited, that is, because the latch 1 can be attached on a vertical surface or a horizontal surface or another surface, the design of the device can be freely selected.

Figure 11:
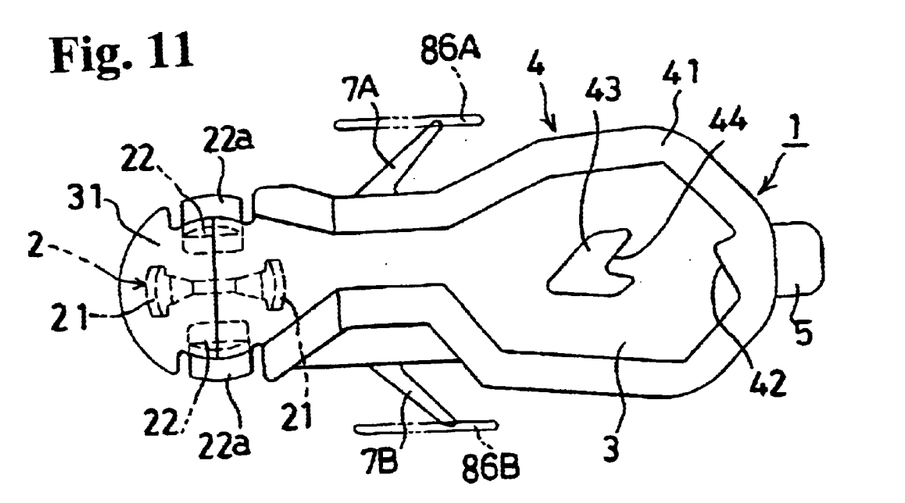
FIG. 11 is a plan view showing a latch in another embodiment of the invention.
Figure 12:
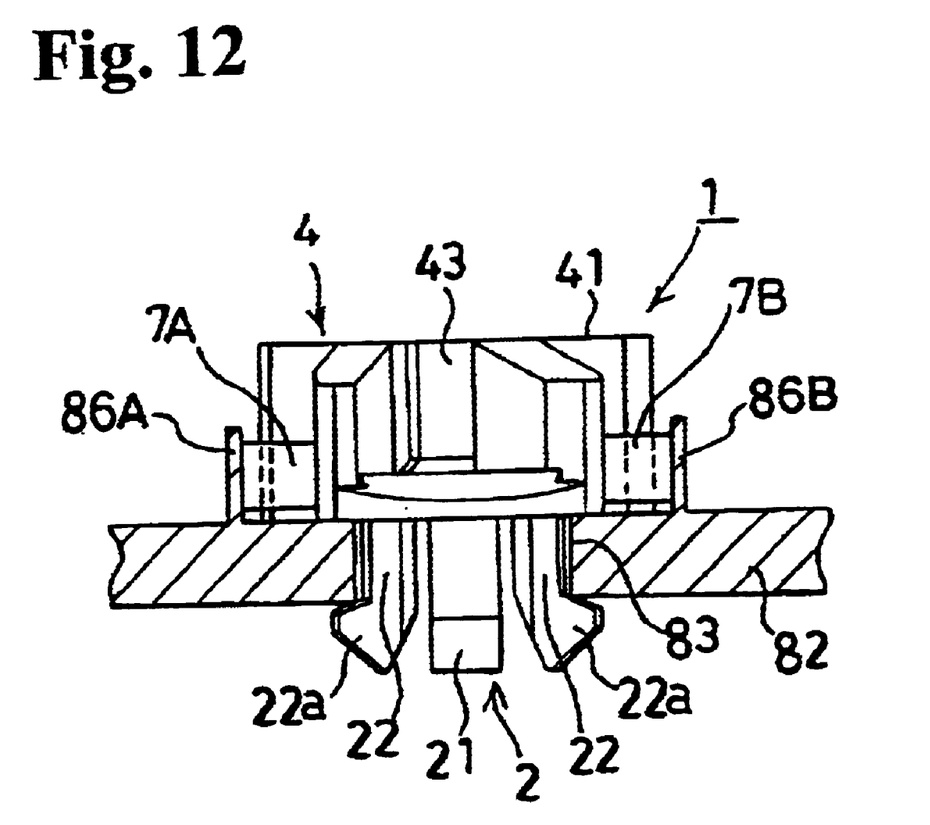
FIG. 12 is an explanatory drawing showing a state in which the latch in another embodiment of the invention is attached to a housing.

FIG. 11 is a plan view showing a latch in another embodiment of the invention, and FIG. 12 is an explanatory drawing showing the state in which the latch in another embodiment of the invention is attached to a housing. The same symbols are assigned to the same parts as those in FIG. 1 to FIG. 10, and the explanations thereof are omitted.

In these drawings, reference numerals 7A, 7B indicate elastic pieces connected on both sides of the base plate part 3 at the same height as the base plate part 3. The elastic pieces are inclined so as to open out in the directions away from the base plate part 3 as they advance from the side of the attaching part 2 to the side of the coupling piece 5.

Reference numerals 86A, 86B indicate checking projections connected on the horizontal surface of the housing 82 corresponding to the elastic pieces 7A, 7B, and the elastic pieces 7A, 7B abut against them.

The elastic pieces 7A, 7B correspond to the elastic pieces 6A, 6B in the previous embodiment, and the checking projections 86A, 86B correspond to the inclined surfaces 85A, 85B in the previous embodiment.

Because the operation of the latch 1 in this embodiment is the same as that of the latch 1 in the previous embodiment, the explanation is omitted. In the latch 1 in this embodiment, the same effects as those of the latch 1 in the previous embodiment can be obtained.

Also, even when the drawer device 81 is constituted by using the latch 1 in this embodiment, the same effects as those of the latch 1 in the previous embodiment can be obtained.

In the above embodiments, the examples in which the latch 1 is attached to the housing 82 and the coupling pin 89 is provided on the cup holder 87 are shown. However, it is possible to configure that the coupling pin 89 is provided on the housing 82 and the latch 1 is attached to the cup holder 87 in order to operate in the same manner and obtain the same effects.

Also, the example in which the container part of the drawer device 81 is made as a cup holder 87 is shown. However, the container part also may be another thing, for example a box-shaped compartment for small articles.

Furthermore, the example in which the latch 1 is disposed on a horizontal surface is shown. However, the latch 1 also may be disposed on a flat surface other than a horizontal surface, such as a vertical surface or a sloping surface.

According to the latch of the present invention as described above, because the base plate part is urged toward the initial or expected position by the elastic pieces connected on both sides of the base plate part and the elastic pieces abut against the attached part, a strange sound is not made during the operation and the erroneous operation can be eliminated.

Also, because the elastic pieces are deformed only during the locking or the unlocking, deformation due to a creep phenomenon becomes less likely to occur in the elastic pieces, and the life becomes longer and the erroneous operation becomes less likely to occur.

Furthermore, because the base plate part is urged toward the initial or predetermined position by the elastic pieces connected on both sides of the base plate part, the latch can be made to rotate even when attached on a horizontal surface, and it can perform the expected operation.

Because the drawer device is constituted by using this latch, the life of the drawer device can be longer. Also, it can provide a sense of quality due to the fact that a strange sound is no longer made during the operation.

Also, because the position in which the latch is attached is no longer limited, that is, because the latch can be attached on a vertical surface or a horizontal surface or another surface, the drawer or device using the latch can be designed freely.

While the invention has been explained with respect to the specific, embodiments of the invention, the explanation is illustrative and the invention is limited only to the appended claims.

What is claimed is:

1. A latch, comprising:

an attaching part adapted to be rotationally attached to an attached part, a base plate comprising a guide wall enclosing a path and connected to the attaching part to rotate together with the attaching part on the attached part, a push-push type cam part connected to the base plate on a side opposite to the attaching part, and elastic pieces formed on two lateral sides of the base plate at portions away from the attaching part toward the cam part, said elastic pieces urging the base plate to return to a predetermined center position when the base plate rotates around the attaching part.

2. A latch according to claim 1, wherein said elastic pieces are projections inclined downwardly from the base plate toward tips thereof.

3. A latch according to claim 1, wherein said elastic pieces are projections inclined relative to a longitudinal direction of the base plate.

4. A latch according to claim 1, wherein said base plate includes a projection at a side away from the attaching part, said projection being adapted to slidably engage the attached part so that the base plate can be rotated in a predetermined angle around the attaching part.

5. A latch according to claim 4, further comprising a coupling pin adapted to be attached to a counter part and contacting and engaging the cam part, said base plate being rotated around the attaching part by a contact of the coupling pin with the cam part.

6. A drawer device having the latch according to claim 1, comprising:

a housing, a container part slidably attached to the housing, and a coupling part attached to one of the housing and the container part for operating on the cam part of the latch, said latch being attached to the other of the housing and the container part operating as the attached part.

7. A drawer device according to claim 6, wherein said housing includes means for cooperating with the elastic pieces, said means engaging the elastic pieces to return the base plate in the predetermined center position when the base plate is rotated relative to said means.

8. A latch comprising:

an attaching part adapted to be rotationally attached to an attached part, a base plate comprising a guide wall enclosing a path and connected to the attaching part to rotate together with the attaching part on the attached part, a push-push type cam part connected to the base plate on a side opposite to the attaching part, elastic pieces formed on two lateral sides of the base plate at portions away from the attaching part toward the cam part, said elastic pieces urging the base plate to return to a predetermined center position when the base plate rotates around the attaching part, and means for cooperating with the elastic pieces adapted to be attached to the attached part, said means engaging the elastic pieces to return the base plate in the predetermined center position when the base plate is rotated relative to said means.

9. A latch according to claim 8, wherein said means for cooperating with the elastic pieces includes inclined surfaces to contact with the elastic pieces, said base plate being disposed between the inclined surfaces in the predetermined center position.

10. A latch according to claim 8, wherein said means for cooperating with the elastic pieces includes checking projections on two lateral sides of the base plate, said checking projections contacting with the elastic pieces to urge the base plate in the predetermined center position.

* * * * *